United States Patent Office 2,920,239
Patented Jan. 5, 1960

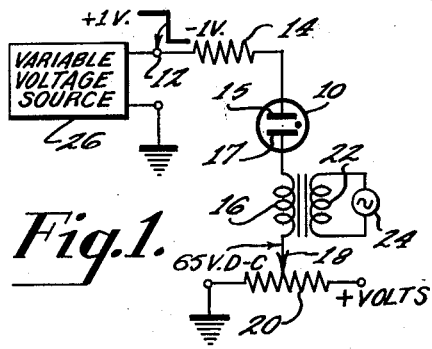
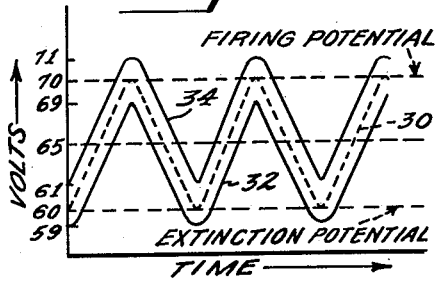
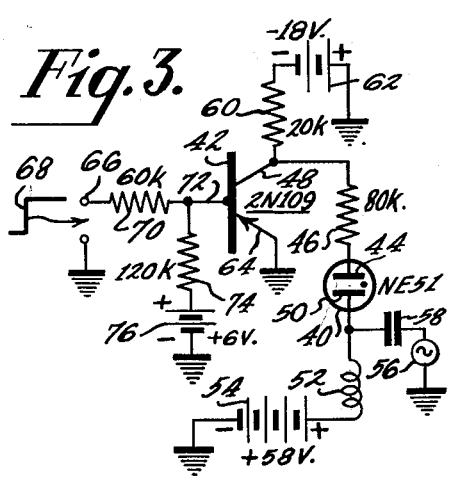
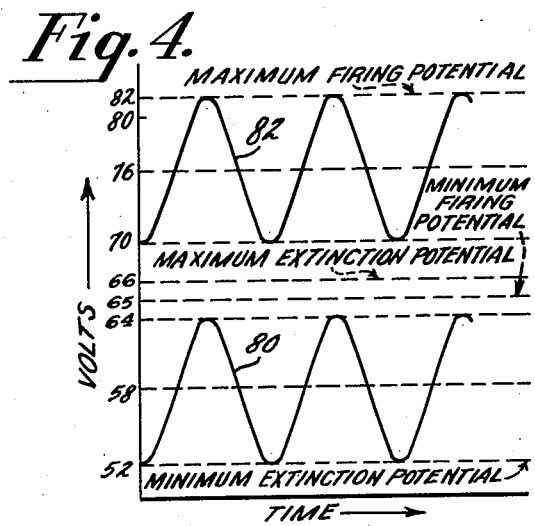
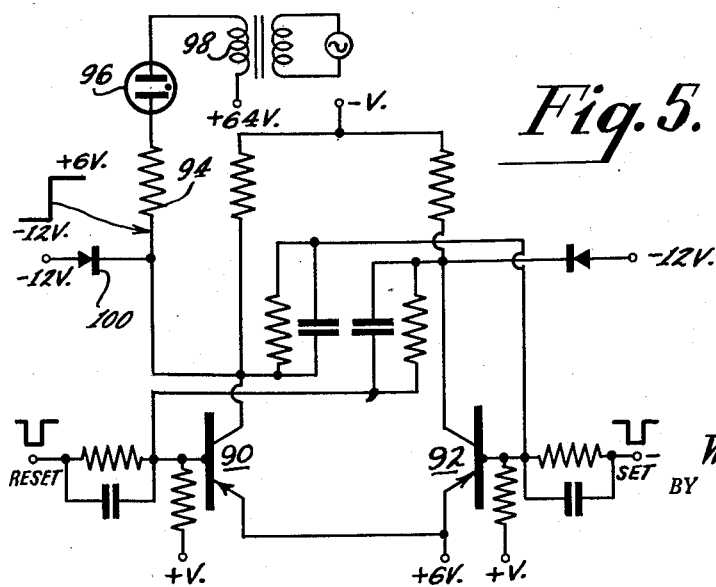
INVENTOR.
Waldemar Saeger
BY
ATTORNEY.

2,920,239

SIGNAL DETECTING CIRCUIT

Waldemar Saeger, Pennsauken, N.J., assignor to Radio Corporation of America, a corporation of Delaware Application January 30, 1957, Serial No. 637,161

4 Claims. (Cl. 315—170)

This invention relates to signal detecting or indicating circuits, and particularly to such circuits that employ devices having a hysteresis characteristic.

One device having a hysteresis characteristic is a gas discharge tube. Such a tube has a firing potential that is substantially greater than its extinction potential. As a result of this hysteresis, a gas tube such as a neon diode is lighted by a potential in excess of its firing (or ionizing) potential, and, once lighted, remains lighted at lower potentials that are in excess of the extinction (or deionizing) potential. Similarly, once extinguished, the neon diode remains extinguished at potentials in excess of the extinction potential but less than the firing potential. Such a tube may be used to indicate two voltage levels by its lighted and extinguished conditions, respectively.

One form of such neon diode, the type NE51, may have as much as ten or twenty volts spread between the firing and extinction potentials. Consequently, this tube may not be used directly for indicating two voltage levels that differ by an amount substantially less than the difference between the firing and extinction potentials, for example, a voltage of approximately one volt. These neon tubes have been limited in their utility by considerable variation from tube to tube in the firing and in the extinction potentials. Another limitation in utility results from the characteristics of the tubes changing substantially as they age.

It is among the objects of this invention to provide:

A new and improved indicator circuit using gas discharge tubes;

A new and improved gas tube indicator circuit for indicating small voltage changes;

A new and improved gas tube indicator circuit that is reliable in operation notwithstanding variations in tube characteristics.

In accordance with this invention, a hysteresis device, such as a gas discharge tube, is connected to receive voltages to be indicated and also a bias voltage that includes a direct voltage component and an alternating voltage component. The received and bias voltages are combined so that in ordinary operation the device is either turned on or turned off.

The foregoing and other objects, the advantages and novel features of this invention, as well as the invention itself both as to its organization and mode of operation, may be best understood from the following description when read in connection with the accompanying drawing, in which like reference numerals refer to like parts, and in which:

Figure 1 is a schematic circuit diagram of an indicator circuit embodying this invention;

Figure 2 is an idealized graph of the voltages applied to the indicator tube of Figure 1;

Figure 3 is a schematic circuit diagram of another embodiment of this invention;

Figure 4 is an idealized graph of voltages that may appear across the indicator tube of Figure 3; and Figure 5 is a schematic circuit diagram of a gas tube indicator circuit embodying this invention used to indicate the states of a flip-flop circuit.

In Figure 1, a gas tube indicator circuit embodying this invention is shown. This circuit includes a gas diode 10, which may be a neon tube. An input terminal 12 is connected through a current limiting resistor 14 to one electrode 15 of the gas tube 10. The other electrode of the gas tube 10 is connected through a secondary winding 16 of a transformer to an adjustable tap 18 of a potentiometer 20. One terminal of the potentiometer 20 may be connected to the positive terminal of a direct-voltage (D.C.) source, and the other terminal may be connected to a common return shown by the conventional ground symbol. The primary 22 of the transformer (which may be a filament transformer) receives an alternating (A.C.) voltage from a source 24, which source 24 may be a 60-cycle line.

The input terminal 12 receives a voltage that varies in amplitude from a source 26 of variable voltage. By way of example, the voltage from the source 26 is shown as a step voltage going from +1 volt to —1 volt with respect to ground. By way of illustration, the gas tube 10 is assumed to have a firing potential of 70 volts and an extinction potential of 60 volts. The potentiometer tap 18 is adjusted to provide a direct-voltage approximately midway between the firing and extinction potentials, that is, a D.C. level of 65 volts. The voltage supplied by the transformer secondary 16 is approximately the difference between the firing and extinction potentials, which is, for the assumed tube characteristics, 10 volts peak-to-peak. Thus, the combined voltage supplied to the tube electrode 17 by the transformer secondary 16 and the potentiometer 20 together is an alternating voltage that varies 5 volts from the D.C. level of 65 volts. This voltage waveform supplied to the tube electrode 17 is shown in broken lines in Figure 2 and is referenced by the numeral 30.

In operation, assume that the tube 10 is extinguished initially, and that the voltage at the input terminal 12 is +1 volt. Under these circumstances, the voltage across the electrodes 15 and 17 of the tube 10 varies between 59 and 69 volts as shown by the waveform 32 (Figure 2). Thus, the voltage across the tube 10 remains less than the firing potential of the tube 10, and the tube remains extinguished. If the input terminal voltage is changed to —1 volt, the combined voltage across the tube 10 varies between 61 volts and 71 volts as shown by the waveform 34. When the voltage across the tube 10 rises above the firing potential of 70 volts, the tube fires; this firing occurs within a cycle of the alternating voltage supplied by the source 24. Once fired, the tube 10 remains in the lighted condition, because the voltage across the tube remains above the extinction potential of 60 volts. When the input terminal voltage rises again to +1 volt, the voltage across the tube 10 follows the waveform 32, and falls below the extinction potential within one cycle of the A.C. voltage. At that time, the tube is extinguished, and remains extinguished until the input voltage drops again to —1 volt.

Thus, by means of the combined direct and alternating bias voltages supplied by the potentiometer 20 and the transformer secondary 16, the circuit of Figure 1 indicates small input voltage changes that are substantially less than the difference between the firing and extinction voltages of the tube 10. The tube 10, once fired (or extinguished), remains fired (or extinguished) as long as the corresponding input voltage is supplied. Thereby, the tube 10 provides an essentially fully-lighted or a fully-extinguished indication corresponding to the input voltage received. The variable voltage source 26 may be any device that provides different voltages; for example, the source 26 may be the indicating arm of a bridge circuit or an electronic switch circuit.

The frequency of the A.C. source 24 may have a considerable range, depending on the response time of the neon tube 10 and the time of duration of a voltage step (the display time of the voltage step) at the input terminal 12. The maximum frequency must be such that within a cycle the voltage is either above the firing potential or below the extinction potential for a sufficient time for the tube to change state, that is, the maximum frequency should be not greater than the response frequency of the tube. The minimum frequency is significant if the voltage at the terminal 12 is in the form of a momentary voltage step, positive or negative with respect to ground. Under such circumstances the frequency should be such that a complete A.C. cycle occurs during the display time of the step.

In Figure 3, a neon diode 40 is used to indicate the state of conduction or non-conduction of an electronic switch in the form of a transistor 42. One electrode 44 of tube 40 is connected through a current limiting resistor 46 to the collector 48 of the transistor 42. The other electrode 50 of tube 40 is connected through a choke coil 52 to a direct voltage source 54, shown as a battery, the other terminal of which is connected to ground. An A.C. source 56 is coupled by a capacitor 58 to the electrode 50. (Alternatively the A.C. coupling may be a transformer as described above with respect to Figure 1, which arrangement would not use the choke 52.)

In the transistor circuit, the collector 48 is connected through a collector load resistor 60 to the negative terminal of a source 62 of operating potential, the positive terminal of which is returned to ground. The emitter 64 is also connected to ground. An input terminal 66, which receives a step voltage 68 with respect to ground, is connected through a resistor 70 to the base 72 of the transistor 42. The base 72 is connected through a biasing resistor 74 to the positive terminal of a source of biasing potential 76, the negative terminal of which is returned to ground. The parameters shown in Figure 3 are illustrative of an operative embodiment of this invention and are not construed as a limitation of the scope of this invention.

It is assumed that the neon tube 40 may have a range of firing and extinguishing potentials. This range of characteristics may be due to the variations that usually occur in manufacture of such tubes, or they may be due to the changes that occur with aging of a tube. By way of illustration, it is assumed that the maximum of the range of firing potentials that the tube 40 may have is 82 volts (as indicated by a dotted horizontal line in Figure 4). The minimum firing potential is assumed to be 65 volts (as shown in Figure 4); the maximum extinction potential, 66 volts; the minimum extinction potential, 52 volts. Thus, the hysteresis range, that is, the difference between the maximum firing potential and the minimum extinction potential, of the tube 40 is 30 volts, for the assumed values, which range has been encountered in practice. Actually, a particular tube 40 has a particular firing potential and a particular extinction potential, both within the hysteresis range, at any time of circuit range.

In the transistor circuit, the collector-emitter operating voltage level (supplied by the source 62) may be chosen at a suitable value substantially below the breakdown voltage. For the transistor type indicated in Figure 3, the usual breakdown voltage may be expected to be less than the 30-volt hysteresis range that is assumed. For conservative operation, the voltage across the collector-emitter path may be 18 volts, and —18 volts is used as the collector voltage for the illustrated circuit.

The peak-to-peak amplitude of the A.C. voltage supplied by the source 56 to the electrode 50 is chosen to have a value that, together with the collector voltage, supplies the maximum range of hysteresis voltage (the difference between the maximum firing potential and the minimum extinction potential). For the illustrated case, the peak-to-peak A.C. voltage is about 12 volts. The value of the voltage supplied by the direct voltage source 54 is then chosen so as to provide a suitable range of voltages across the tube 40 for the two conditions of the transistor 42 being conducting and non-conducting, respectively. For these two transistor conditions, this voltage range is such that the minimum extinction potential and maximum firing potential of the range of characteristics are respectively supplied. For the illustrative values considered, this direct bias voltage from the source 54 is 58 volts.

In operation, when a relatively low voltage input level is applied to the input terminal 66 to render the transistor 42 conductive, the voltage at the collector 48 is substantially ground potential. Under these conditions, the voltage across the tube 40 is the sum of the direct bias voltage from the source 54 and the A.C. voltage supplied through the condenser 58; this combined voltage is shown in idealized form as the waveform 80 in Figure 4. The voltage applied to the tube electrode 50, which is also substantially the voltage across the tube 40, varies approximately between 52 volts and 64 volts, as shown by waveform 80. Thus, this voltage across the tube 40 is always at least equal to the minimum extinguishing potential, and the tube 40 is extinguished.

When a relatively high level of input voltage is applied to the input terminal 66, the transistor is cut off, and the collector voltage falls toward the —18 volt level of the source 62. With the collector 48 at —18 volts, the voltage across the tube 40 takes the form of the idealized graph 82 (Figure 4). That is, the voltage across the tube 40 varies approximately between 82 volts and 70 volts. Thus, within one cycle of the A.C. voltage 82, at least the maximum firing potential level of 82 volts across the tube 40 is attained (unless the tube 40 fires at a lower potential level) and the tube 40 fires. Once fired, the tube remains fired, because the voltage across the tube does not fall to the maximum extinction potential level. The circuit remains in this condition until the transistor is again rendered conductive. Under such circumstances, the collector voltage is substantially at ground potential, and the voltage across the tube 40 again takes the form of the waveform 80. Within one cycle of that waveform 80, the voltage across the tube falls to the minimum extinction potential level and the tube 40 is extinguished. The tube remains in the extinguished condition until the transistor 42 is again cut off, and the collector voltage decreases, as described above.

Thus, with the circuit of Figure 3, a neon tube 40 may be used to indicate the conductive state of a transistor 42, with the voltage swing at a transistor electrode being substantially less than the range of hysteresis of the neon tube 40. The transistor electrode voltage may be substantially less than the breakdown voltage of the transistor, so that it may be operated conservatively. This transistor electrode voltage, together with the A.C. bias voltage, assures proper operation over a substantial range of neon tube hysteresis.

The waveforms 80 and 82 in Figure 4 respectively represent two dynamic conditions of operation of the tube 40; that is, the waveform 80 represents the periodic voltage across the tube 40 for the condition of the tube being completely extinguished during each cycle of the alternating voltage. In the fired condition the waveform 82 represents the periodic voltage across the series combination of the resistors 60 and 46 and the tube 40. As may be seen in Figure 4, the maximum extinction potential and the minimum firing potential, in the range of tube characteristics that is assumed, are not included within the dynamic ranges of potential across the tube, or across the series network including the tube, for either the fired or extinguished conditions. One reason for such a condition is that the maximum extinction potential is greater than the minimum firing potential for the assumed range of variations. These latter potentials should be respectively outside of the fired and extinguished dynamic ranges if the tube 40 is to be completely extinguished or completely fired over each cycle.

By using a larger amplitude alternating voltage, say, a peak-to-peak amplitude of about 16 volts instead of 12 volts, the tube 40, once fired, would continuously remain in the fired condition for each A.C. cycle. However, the voltage across the tube 40, when it should be in the extinguished condition, would exceed the minimum firing potential level of 65 volts during a small portion of each A.C. cycle. Thus, the tube 40 may actually be fired for about a quarter cycle when it should be in the extinguished condition. This momentary firing of the tube 40 provides a dim light indication (instead of a completely extinguished indication) that is in contrast with a bright light indication. These dim and bright light indications represent the two conditions of the transistor (or the two voltage levels being indicated). Similarly, for other firing and extinction potential variations than those indicated in Figure 4, the peak-to-peak A.C. voltage amplitude may be so chosen that the tube 40 would be completely extinguished for each A.C. cycle to represent one input voltage level, and fired for say ¾ of an A.C. cycle to represent the other input voltage level. Such increase of the A.C. voltage amplitude permits a greater range of variation in tube characteristics at the sacrifice of the amount of difference in light levels that is used to provide the indications desired.

The circuit of Figure 3 may be used with various transistor circuits to indicate voltage variations at other transistor electrodes.

In Figure 5, a bistable transistor flip-flop is shown, the two stable states of which are indicated by a neon tube circuit of the type described above with respect to Figure 3. The flip-flop includes two transistors 90 and 92 that are cross-coupled in a well known manner from collector to base by means of resistor-capacitor combinations. These transistors 90 and 92 may be set and reset respectively by negative going pulses applied to their bases.

Connected to the collector of the transistor 90 is an indicating circuit of the type described above; namely, the series combination of a limiting resistor 94, a neon tube 96, and a D.C. and A.C. power supply that includes a transformer 98. A diode 100 is used to clamp the collector of the transistor 90 to a suitable voltage level, shown in Figure 5 as —12 volts. The emitter of the transistor 90 is returned to a reference level of +6 volts, which condition results in a voltage swing at the collector of the transistor 90 between —12 volts and +6 volts for the transistor being in the conductive and non-conductive states respectively. Assuming the same range of variations in neon tube characteristics as those discussed above with respect to Figures 3 and 4, a 12 volt peak-to-peak A.C. voltage amplitude is provided by the transformer 98. The D.C. bias voltage level is 64 volts (instead of the 58 volts shown in Figure 3) because the D.C. level of the collector voltage is 6 volts higher in the circuit of Figure 5.

In operation, the flip-flop is in the set condition when the transistor 90 is non-conductive and the transistor 92 is conductive. The flip-flop is reset when the reverse transistor conditions exist. With the flip-flop set and the transistor 90 non-conductive, the collector voltage tends to fall towards the negative operating potential level, and is clamped at —12 volts by the diode 100. This potential level results in the neon tube 96 being fired. When the flip-flop is reset, the transistor 90 is in the conductive condition, which results in a collector voltage of substantially +6 volts. As a result, the voltage across the tube 96 is reduced to below the extinction potential, and the tube 96 is extinguished. Thus, lighted and extinguished conditions of the tube 96 respectively indicate set and reset conditions of the flip-flop circuit.

Such indicator circuits may be used to indicate the states of a plurality of similar flip-flops connected, for example, as a binary counter. The tubes 46 of each such indicator may be connected to but a single A.C. and D.C. power supply; that is, the transformer 98 and +64 volt D.C. source would be common to all the indicators.

By means of this invention, a new and improved indicator circuit is provided by means of gas discharge tubes. Such tubes may be used for indicating relatively small voltage changes, and reliable operation may be provided notwithstanding variations in tube characteristics.

What is claimed is:

1. In combination, a device having a turn-on voltage of a first value and a turn-off voltage of a second value; means for applying an alternating voltage to said device having a peak-to-peak amplitude not greater than the difference between said first and second values; and means for applying a direct voltage to said device which can be switched between a first level at which one peak of said alternating voltage exceeds said turn-on voltage and a second level at which the other peak of said alternating voltage is less than said turn-off voltage.

2. In the combination as set forth in claim 1, said last-named means including a direct bias voltage source and a source providing a direct voltage having one of two discrete values, the difference between said values being only a fraction of the difference between said turn-on and turn-off voltages.

3. In combination, a gas discharge device having solely two electrodes, said device having a firing voltage of one value and an extinction voltage of another, substantially lower value; means for applying across said electrodes an alternating voltage having a peak-to-peak amplitude substantially equal to the difference between said firing and extinction voltages; and means for applying in series with said alternating voltage a control voltage which can be switched between a first level at which one peak of said alternating voltage exceeds said firing voltage and a second level at which the opposite peak of said alternating voltage is less than said extinction voltage.

4. In combination, a gas discharge device having solely two electrodes, said device having a firing voltage of one value and an extinction voltage of another, substantially lower value; means for applying a direct biasing voltage across said electrodes having a value substantially half-way between the firing and extinction voltages of said discharge device; means for applying in series with said biasing voltage an alternating voltage having a peak-to-peak amplitude not greater than the difference between said firing and extinction voltages; and means for applying in series with said biasing voltage a direct voltage having one of two discrete levels, said levels being such that at one level one peak of the alternating voltage fires said discharge device, and at said other level the opposite peak of the alternating voltage extinguishes said discharge device.

References Cited in the file of this patent

UNITED STATES PATENTS

| | | |
|---|---|---|
| 2,069,915 | Edwards et al. | Feb. 9, 1937 |
| 2,128,395 | Berndt et al. | Aug. 30, 1938 |
| 2,246,046 | Holden | June 17, 1941 |
| 2,506,723 | Larsen | May 9, 1950 |